United States Patent [19]

Jones

[11] Patent Number: 4,664,421
[45] Date of Patent: May 12, 1987

[54] FORGIVING PROFILE PIPE GASKET

[76] Inventor: William D. Jones, Galaxie Sales Co., P.O. Box 236, Warminster, Pa. 18974

[21] Appl. No.: 901,600

[22] Filed: Aug. 29, 1986

[51] Int. Cl.$^4$ .............................................. F16L 17/02
[52] U.S. Cl. ................................... 285/110; 285/231; 285/345; 285/423; 285/910; 277/207 A
[58] Field of Search ............... 285/110, 423, 345, 230, 285/111, 231, 910; 277/207 A, 208, DIG. 2

[56] References Cited

U.S. PATENT DOCUMENTS

| | | | |
|---|---|---|---|
| 2,897,533 | 8/1959 | Bull et al. | 285/110 X |
| 3,057,408 | 10/1962 | Griffitts | 277/208 |
| 3,124,040 | 3/1964 | Friedler | 285/110 X |
| 3,150,876 | 9/1964 | Lafferty | 277/208 X |
| 3,386,745 | 6/1968 | Hein | 277/207 A |
| 4,343,480 | 8/1982 | Vassallo | 277/208 X |

FOREIGN PATENT DOCUMENTS 2078327 1/1982 United Kingdom ........... 277/207 A

Primary Examiner—Dave W. Arola
Attorney, Agent, or Firm—Howson and Howson

[57] ABSTRACT

A gasket particularly suited for providing a leak resistant, deflection tolerant seal for a bell and spigot type of pipe coupling is provided. The gasket comprises a rubber web having a plurality of identical sealing ribs projecting radially inward in axially spaced relation. Each rib has an enlarged tapered base portion and a narrow finger portion which inclines inwardly and axially therefrom in cantilever fashion and which terminates in a tip spaced radially from the base of an axially adjacent rib. The finger portions are deflected into engagement with their adjacent sealing ribs when the spigot portion of one pipe is inserted axially into the bell portion of the other in which the gasket is mounted. The sealing ring prevent leakage even when the coupled pipes are misaligned slightly.

1 Claim, 4 Drawing Figures

FORGIVING PROFILE PIPE GASKET

FIELD OF THE INVENTION

The present invention relates to pipe gaskets, and more particularly, the present invention relates to pipe gaskets particularly suited for use in bell and spigot type pipe couplings.

BACKGROUND OF THE INVENTION

In a so-called bell and spigot type pipe coupling, one pipe has a female end, or bell, for matingly receiving a male end, or spigot, of another pipe of like construction. Various types of gaskets have been provided over the years for preventing leakage between such pipes when coupled. Leakage is a particularly acute problem when large diameter pipes, such as 4 to 15 inch diameter sewer pipes, are coupled and their axes misaligned, either during assembly or as a result of subsequent soil shifting. While in situ methods of providing a leak resistant joint in such couplings, such as soldering metal pipes or glueing non-metal pipes, may be satisfactory in many applications, there has been a need for a gasket which permits a leakproof pipe joint to be made simply by sliding the pipes together endwise without regard to the precision with which they are aligned endwise.

Pipe gaskets which fit into interior grooves of bell and spigot pipe couplings enabling pipe ends to be slid together to form a leak resistant coupling are known. An example of such a gasket is disclosed in U.S. Pat. No. 4,487,421. A conventional pipe gasket for a typical bell and spigot pipe joint is illustrated in cross-section in FIG. 4 herein. While these pipe gaskets may have utility in certain applications, there is a continuing need for a gasket which provides a fluid tight seal, which can tolerate a certain amount of misalignment between the plates, and which can be installed in a labor efficient manner.

OBJECTS OF THE INVENTION

With the foregoing in mind, it is a primary object of the present invention to provide a novel pipe gasket which provides a leak resistant joint despite slight misalignment which may exist between matingly joined pipe ends.

Another object of the present invention is to provide an improved pipe gasket which enables a leak resistant pipe joint to be made efficiently.

As another object, the present invention provides a unique pipe gasket which enable bell and spigot types of pipes to be coupled together quickly and easily without their necessarily being accurately axially aligned.

SUMMARY OF THE INVENTION

More specifically, the present invention provides a pipe gasket which enables a leak resistant joint to be formed in a bell and spigot pipe coupling. The gasket comprises a flexible web of elastomeric material which is formed about a longitudinal axis into a tube having an outer periphery adapted to engage the inner periphery of the bell portion of one pipe and an inner peripheral surface adapted to confront the outer periphery of the spigot portion of another pipe. The web has a plurality of integral identical sealing ribs which project radially inward from its inner surface in axially spaced relation. Each rib has an enlarged tapered base portion and a narrow finger portion which inclines inwardly and axially therefrom in cantilever fashion. The finger portion terminates in a tip which is spaced radially inward from the base portion of an axially adjacent rib to define therebetween a gap. When the pipes are coupled, the tip of the finger portion of one rib is deflected axially and radially outward into engagement with the finger portion of an axially adjacent rib to close the gap therebetween and to provide therebetween a leak resistant joint which is tolerant of pipe end misalignment.

BRIEF DESCRIPTION OF THE DRAWINGS

The foregoing and other objects, features and advantages of the present invention should become apparent from the following description when taken in conjunction with the accompanying drawings, in which.

DESCRIPTION OF THE PREFERRED EMBODIMENT

Figure 1:
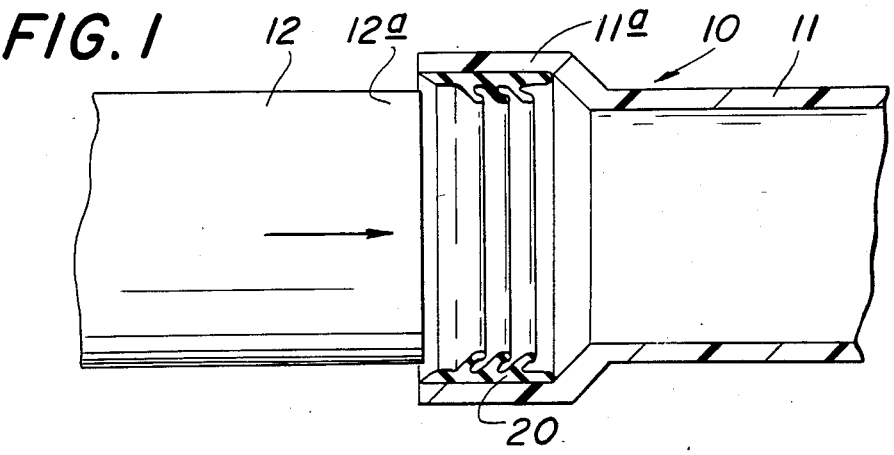
FIG. 1 is a longitudinal sectional view of a pipe coupling wherein a gasket embodying the present invention is shown installed in the bell portion of a pipe for receiving the spigot portion of an axially aligned pipe.
Figure 4:
FIG. 4 is a transverse sectional view of a prior art type pipe gasket used in bell and spigot pipe couplings.

Referring now to the drawings, FIG. 1 illustrates a conventional bell and spigot type pipe coupling 10 in which the gasket of the present invention finds particular utility. As best seen therein, the conventional pipe coupling includes a length of pipe 11 having a flaired end 11a providing a cylindrical recess, or bell, and another length of pipe 12 having a cylindrical end 12a adapted to be inserted lengthwise in the direction indicated by the arrow into the bell portion 11a of the other pipe 11. To prevent leakage between the pipes ends 11a and 12a, an elastomeric gasket, such as illustrated in FIG. 4, has been provided. While gaskets of the type illustrated in FIG. 4 may function satisfactorily when the pipes 11 and 12 are properly aligned and are manufactured in accordance with prescribed tolerances, such gaskets are known to have a proclivity to leak when such conditions do not exist. As result, conventional gaskets have not proven entirely satisfactory under conditions often encountered in the field.

The present invention overcomes the problems associated with conventional pipe gaskets by providing a gasket which has a forgiving profile thereby enabling it to resist leakage even under conditions where the coupled pipes are not properly aligned or are out of tolerance. The gasket of the present invention is also easy to install and can be manufactured using known gasket fabrication technology.

As best seen in FIG. 1, the gasket 20 of the present invention is shown mounted in the bell portion 11a of the pipe 11 immediately prior to insertion of the spigot portion 12a of the pipe 12 thereinto. The gasket 20 is either extruded or molded of an elastomeric material, such as rubber, into the profile illustrated in FIG. 2. When extruded, the thus formed gasket is cut to length and butt seamed to form an annular configuration illustrated in FIG. 1 which is inserted in the bell end 11a of the pipe 11 as illustrated in FIG. 1.

Figure 2:
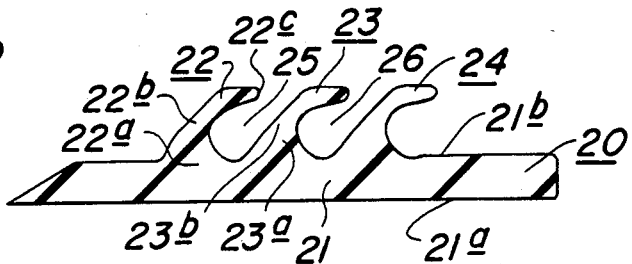
FIG. 2 is an enlarged transverse sectional view of the pipe gasket illustrated in FIG. 1.

As best seen in FIG. 2, the gasket 20 includes a web 21 of rubber having an outer peripheral surface 21a adapted to engage the inner peripheral surface of the bell 11a of the pipe 11 and having an inner peripheral surface 21b adapted to confront the spigot 12a of the pipe 12 when inserted. A series of sealing ribs 22, 23 and 24 are molded integral with the web 21 and normally project inwardly from the inner surface 21b thereof in axially spaced parallel relation. Each rib is of identical construction to the other, and preferably at least three such ribs are provided. Axially adjacent sealing ribs are separated by gaps, such as the gap 25 between the ribs 22 and 23, and the gap 26 between the ribs 23 and 24, respectively.

Each sealing rib, such as the sealing rib 22, has an inwardly tapered enlarged base portion 22a adjacent the web surface 21b and a finger portion 22b integral therewith. The finger portion 22b inclines radially inward and axially with respect to the base portion 22a and terminates in a tip 22c which is spaced radially inward from the web surface 21b and which is spaced from the finger portion 23b of the axially adjacent sealing rib 23 by the gap 25. Thus, the finger portion 22b extends outwardly from its base portion 22a in cantilever fashion in the direction of insertion of the pipe spigot 12a and is dimensioned so that its tip 22c engages the axially adjacent sealing rib 23 adjacent its base when deflected axially and radially such as when the pipe spigot 12a is inserted into the bell 11a of the pipe 11. The sealing rib 23 engages its axially adjacent sealing rib 24 in a like manner.

Figure 3:
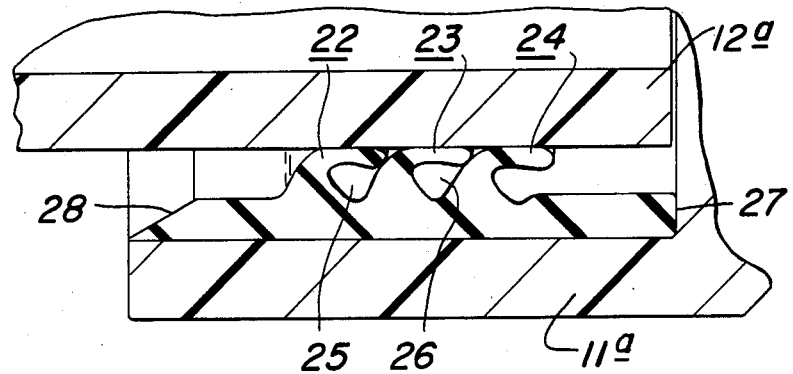
FIG. 3 is an enlarged transverse sectional view of a pipe gasket, similar to FIG. 2, but illustrating the interengagement of the pipe gasket between confronting pipe surfaces.

As best seen in FIG. 3, when the spigot 12a of the pipe 12 is inserted in the bell 11a of the pipe 11, the sealing ribs 22, 23 and 24 deform in the manner illustrated, with the tips of the sealing ribs, such as the ribs 22 and 23, engaging their axially adjacent sealing ribs adjacent their bases in the manner illustrated. The finger portions of the sealing ribs, such as the finger portion 22b of the finger 22, engage the outer periphery of the spigot 12a for a predetermined axial extent both to close the outer portions of the gaps 25, 26 between the ribs 22, 23, respectively and to provide a bearing surface for the spigot 12a and to provide a high resistance leak path axially thereof while extending substantially parallel to the web 21, as shown in FIG. 3. The enlarged tapered base portion 22a of the sealing rib 22 provides additional bearing support for the pipe 12 while the gaps between the sealing ribs, such as the gap 25, accommodate deflection of the base 22a due to radial loads. The gaps between the sealing ribs close against fluid leakage and provide sufficient space between the sealing ribs to accommodate changes in their profile due to variations in the angular relation between the pipes 11 and 12. The inclined disposition of the finger portions of the sealing ribs permits the spigot 12a to be inserted readily into the bell 11a and to deform the sealing ribs into the manner illustrated in FIG. 3 during installation, while tending to resist disengagement in the opposite axial direction by providing a sort of elastic toggle-like action. The sealing ribs also cooperate to increase the resistance to leakage of the joint with increasing hydrostatic pressure as a result of their profiles and arrangement between pipe surfaces.

To prevent the gasket 20 from sliding axially inward relative to the bell 11a during insertion, the gasket 20 is provided with a radially extending abutment surface 27 adapted to engage the inwardly tapered portion of the bell 11a. To facilitate guidance of the spigot 12a into the gasket 20, the gasket 20 is also provided with an inclined guiding surface 28 spaced from the abutment surface 27 with the sealing ribs 22-24 being disposed therebetween. Preferably, an adhesive or sealant is provided between the outer surface 21a of the gasket 20 and the inner surface of the pipe bell 11a.

By way of example, and not by way of limitation, a preferred gasket 20 has an overall length between abutment surface 27 and the tip of the guiding surface 28 of 1.75 inches, a web thickness of 0.125 inches, and an overall height of sealing rib measured from the inner peripheral surface 21a of the gasket 20 of 0.060 inches. Preferably, the gasket 20 is fabricated of Natsyn type synthetic rubber of 50±5 durometer. Such a gasket has been hydrostatically tested in a pipe coupling between polyvinyl chloride pipes in a range of sizes from 4 to 15 inches in diameter and found to provide resistance to leakage at hydrostatic pressures up to about 15 psi. and at misalignment, or deflection, angles of up to about 5 degrees. In transverse load leak tests, the joint has been found to be leak resistant at hydrostatic pressures up to 15 psi. when subjected to lateral loads of a magnitude sufficient to cause a 0.420 percent change in pipe diameter in the direction of applied load. The joint provided by the gasket of the present invention more than meets ASTM Standard No. 477 concerning the use of rubber gaskets in PVC pipes.

In view of the foregoing, it should be apparent that the present invention now provides an improved gasket for pipe couplings. The gasket is particularly useful in plastic pipe bell and spigot pipe couplings. Moreover, in addition to being leak resistant and forgiving of pipe misalignment, the gasket of the present invention is easy to install.

While a preferred embodiment of the present invention has been described in detail, various modifications, alterations and changes may be made without departing from the spirit and scope of the present invention as defined in the appended claims.

I claim:

1. For use in providing a leak resistant pipe joint between plastic pipes of at least four inches in diameter, a gasket comprising: a flexible web of elastomeric material formed about a longitudinal axis into a tube having an outer peripheral surface adapted to engage the inner periphery of one plastic pipe and having an inner peripheral surface adapted to confront the outer periphery of another plastic pipe to be coupled with said one plastic pipe, said web having a plurality of sealing ribs formed integral therewith and projecting radially inward from its inner surface in axially spaced relation, each rib being of substantially identical configuration to the other, each rib having an enlarged inwardly tapered base portion and a narrow finger portion projecting therefrom in cantilever fashion, said finger portion being inclined from said base portion in the direction of insertion of said other plastic pipe into said one plastic pipe, said finger portion terminating in a tip spaced radially inward from the base portion of an axially adjacent rib and thereby normally overlying a portion of the same, said finger portion also being normally spaced axially from the finger portion of said axially adjacent rib by a gap extending between said adjacent sealing ribs, said finger portion being of substantially constant thickness between its base and its tip, said finger portion of a plurality of said ribs normally extending in substantially parallel relation and being adapted to extend substantially parallel to said web and to engage said axially adjacent rib to close said gap between said ribs when said one pipe is inserted into said other while providing a space between said finger portion and said web to accommodate deflections of the sealing ribs due to radial loads, said web having an inclined guide surface on its inner peripheral surface and a radial abutment surface spaced axially therefrom, said plurality of sealing ribs being disposed between said guide and abutment surfaces and being at least three in number, whereby a leak resistant, deflection tolerant pipe joint is provided.

* * * * *